No. 619,531. Patented Feb. 14, 1899.
A. J. BARTLETT, P. JACOBUS & S. W. STAMM.
HARVESTER REEL.
(Application filed Apr. 4, 1898.)
(No Model.) 3 Sheets—Sheet 1.
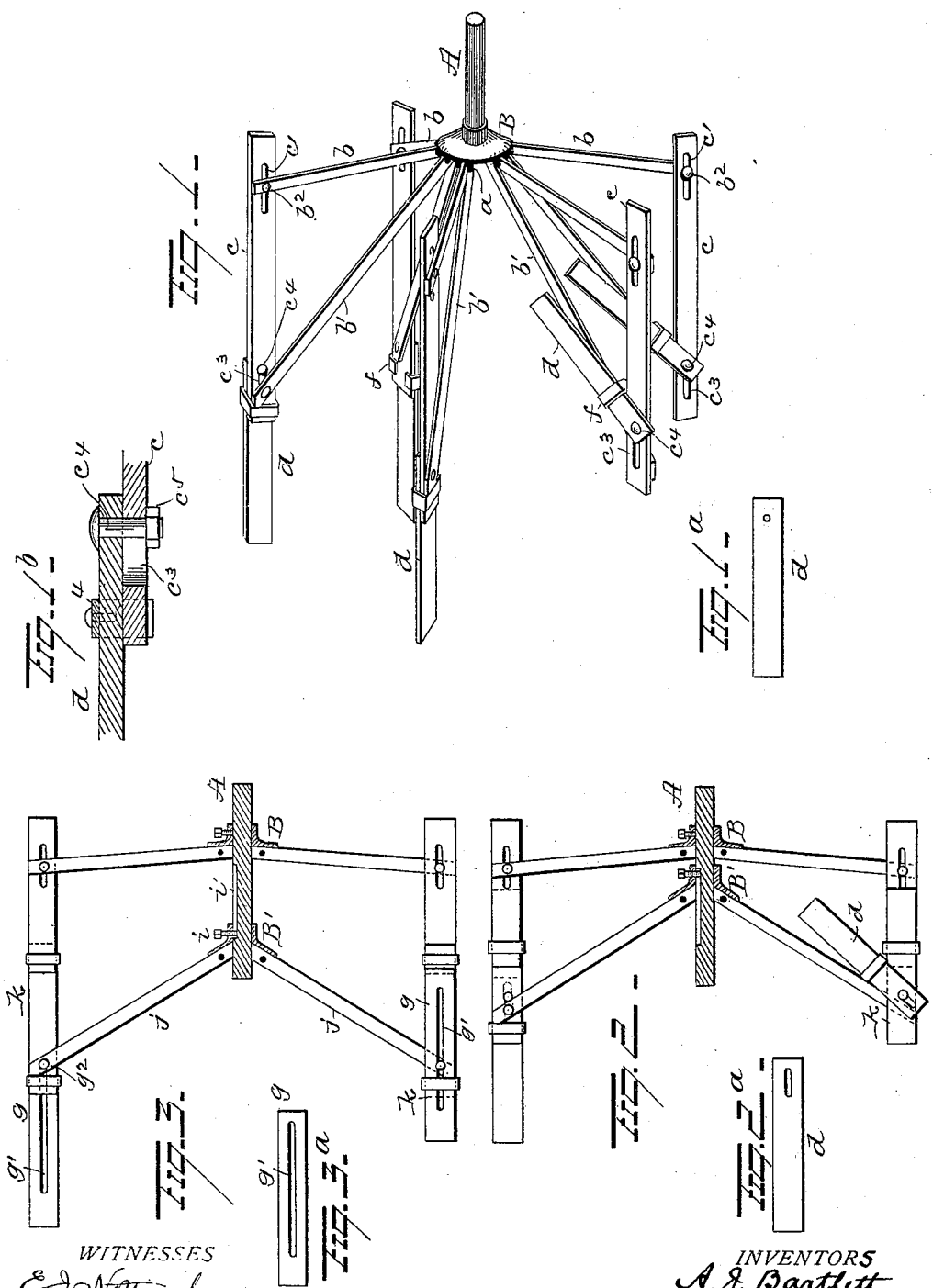
WITNESSES
INVENTORS
A. J. Bartlett,
P. Jacobus and
S. W. Stamm
By H. A. Seymour Attorney

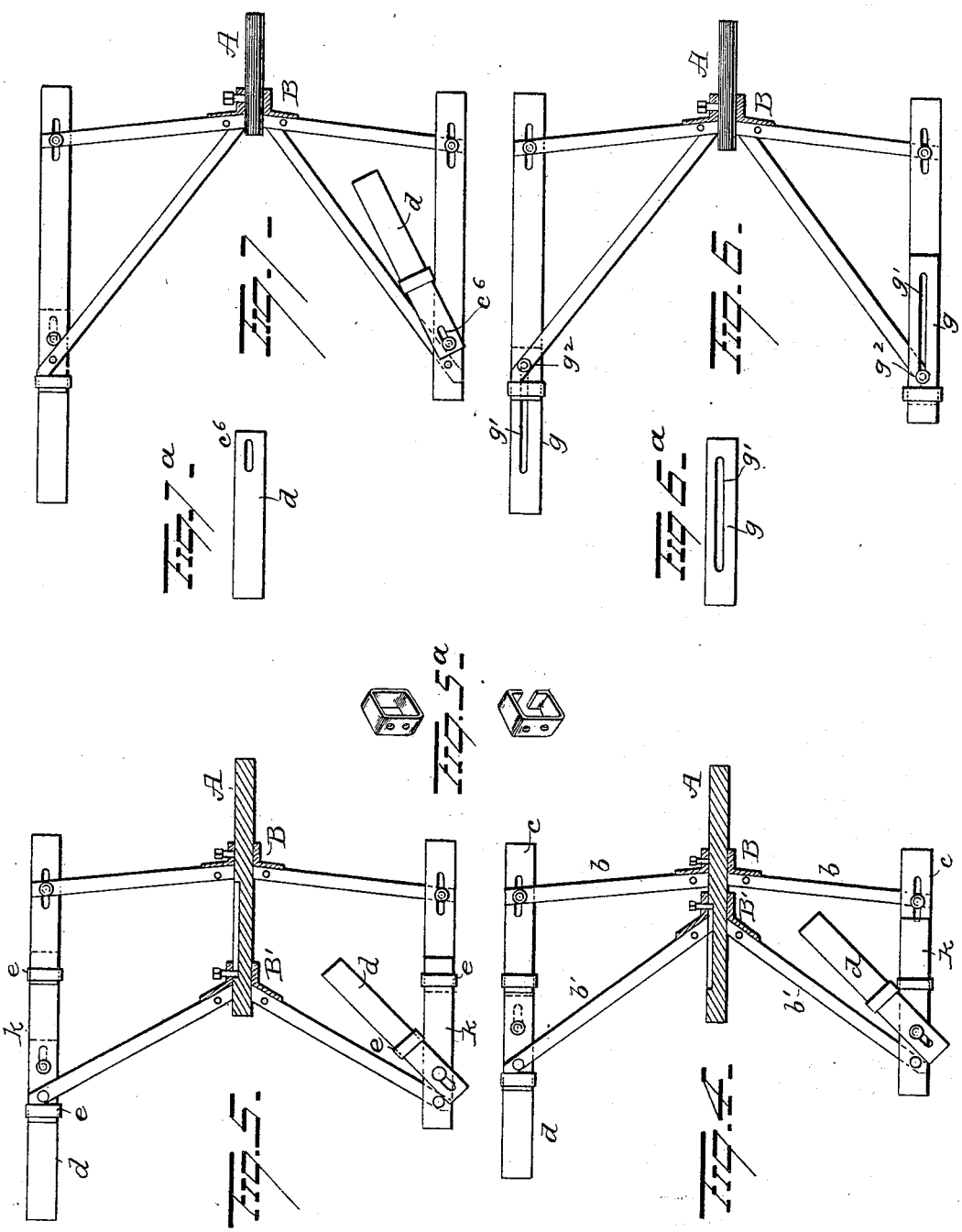

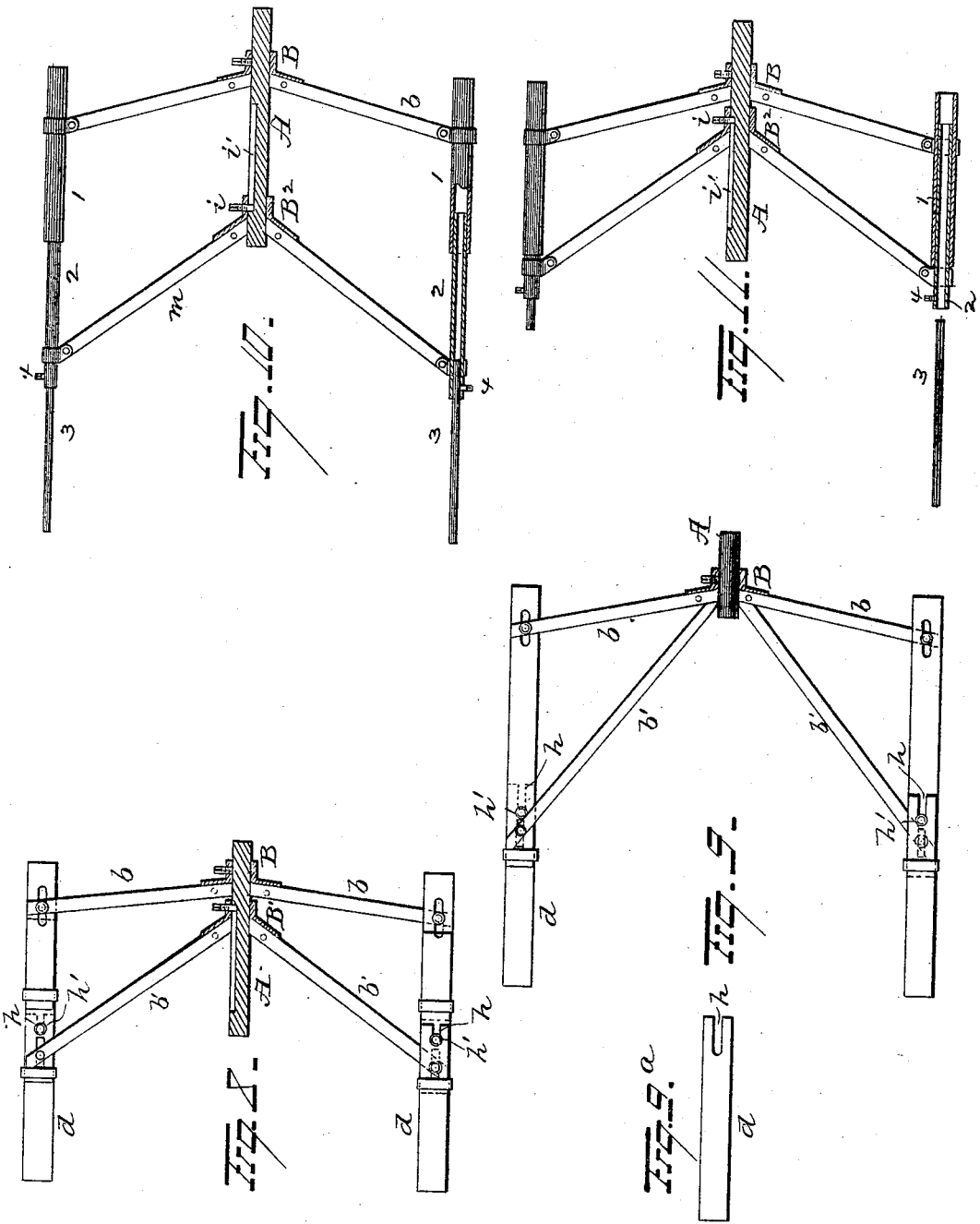

UNITED STATES PATENT OFFICE.

ANDREW J. BARTLETT AND PIERSON JACOBUS, OF ROMULUS, AND SPENCER W. STAMM, OF LIMA, NEW YORK; SAID JACOBUS AND STAMM ASSIGNORS TO SAID BARTLETT.

HARVESTER-REEL.

SPECIFICATION forming part of Letters Patent No. 619,531, dated February 14, 1899.

Application filed April 4, 1898. Serial No. 676,465. (No model.)

*To all whom it may concern:*

Be it known that we, ANDREW J. BARTLETT and PIERSON JACOBUS, of Romulus, Seneca county, and SPENCER W. STAMM, of Lima, Livingston county, State of New York, have invented certain new and useful Improvements in Harvester-Reels; and we do hereby declare the following to be a full, clear, and exact description of the invention, such as will enable others skilled in the art to which it appertains to make and use the same.

Our invention relates to an improvement in reels for harvesters and kindred machinery, the object of the invention being to provide a reel which can be readily contracted or shortened and one which shall be capable of being folded into small space when not in use or when the machine is being transported or when it is stored.

A further object is to so construct a harvester-reel that it can be readily folded or contracted in size without necessity of removing it from the machine.

A further object is to construct a harvester-reel in such manner that it can be so folded while on the machine as to be out of reach of limbs of trees when the machine is transported over a road.

A further object is to so construct a harvester-reel adapted to be folded that it shall be strong and durable and capable of use in any condition or size to which it is capable of adjustment.

With these objects in view the invention consists in certain novel features of construction and combinations and arrangements of parts, as hereinafter set forth, and pointed out in the claims.

In the accompanying drawings, Figure 1 is a perspective view of a reel, showing one embodiment of our invention. Fig. 1$^a$ is a detail view of an outer section of one of the reel-blades. Fig. 1$^b$ is a sectional view of the adjustable connection between two sections of a blade. Fig. 2 is an elevation, partly in section, of a reel provided with blades having three sections each. Fig. 2$^a$ is a detached view of one of the outer blade-sections employed with the reel shown in Fig. 2. Fig. 3 is an elevation, partly in section, showing a reel having blades made in three sections with a slightly-different form of adjustable connection between the blade-sections. Fig. 2$^a$ is a detail view of one of the outer blade-sections used with the reel shown in Fig. 3. Fig. 4 is an elevation, partly in section, of a reel having blades with three sections and showing the central sections moved back on the inner sections. Fig. 5 is a similar section with the central sections of the blades extended. Fig. 5$^a$ illustrates the collars or bands for connecting the blade-sections. Fig. 6 is a view showing blades with two sections, the outer sections adapted to slide on the inner sections. Fig. 6$^a$ is a detail view of one of the outer blade-sections. Fig. 7 is a view showing the blades having two sections, with the outer sections pivotally connected with the inner sections. Fig. 7$^a$ is a detail view of one of the outer blade-sections of the reel shown in Fig. 7. Figs. 8, 9, and 9$^a$ are views illustrating slight modifications of the connections between the blade-sections. Figs. 10 and 11 are views showing telescopic blade-sections.

A represents the reel-shaft, to the end of which, in the forms shown in Figs. 1, 6, 7, and 9$^a$, a hub or casting B is secured. The hub or casting B is made on its inner face with a number of sockets $a$, in which the inner ends of radiating arms or braces $b$ are secured. The outer ends of the arms $b$ adjustably support the inner ends of the inner blade-sections $c$, the latter being provided with elongated slots $c'$, through which and the arms $b$ pins $c^2$ pass. Outwardly-projecting radiating arms or braces $b'$ are also secured to the hub or casting B, (or to the inner ends of arms $b$,) and at their outer ends said arms $b'$ are secured to the outer ends of the inner blade-sections $c$.

In the form of the invention shown in Fig. 1 the inner blade-sections $c$ are provided near their outer ends with elongated slots $c^3$, through which pins $c^4$ pass and serve to pivotally connect the outer blade-sections $d$ to said inner blade-sections. Normally the sections $c\,d$ of each blade are disposed in alinement with each other and held in this position by means of a collar secured to the outer blade-sections. This collar may be made in the form of a complete band, as shown at $e$, or a partial band, as shown at $f$, Fig. 5$^a$. When it is desired to shorten the reel, the outer blade-sections $d$ may be slid outwardly, so as to free the band from the inner section $c$ and then turned on the pin $c^4$ to the position shown at the right-hand side of Fig. 1. After having been made to assume this position a nut $c^5$ on the end of pin $c^4$ may be tightened to retain the blade-section in place.

Instead of making the slots $c^3$ in the outer ends of the inner blade-sections elongated, slots $c^6$ may be made in the inner ends of the outer blade-sections $d$, as shown in Fig. 7. Instead of pivotally connecting the outer blade-sections and securing the collars thereto, the collars may be secured to the inner blade-sections and the outer blade-section $g$ made to slide back on the inner sections, in which case the outer blade-sections will be made with long slots $g'$ for the passage of pins $g^2$, as shown in Figs. 3, 3$^a$, 6, and 6$^a$.

If desired, the outer blade-sections may be provided at their inner ends with open slots $h$, as shown in Figs. 9 and 9$^a$, to engage pins $h'$ on the inner blade-sections, whereby to normally prevent said outer sections from turning relatively to the inner sections.

It is often found desirable to construct each blade of the reel in three sections, and in such case two hubs B and B' will be located on the reel-shaft, the hub B being fixed and the hub B' adjustable. Such construction is shown in Figs. 2, 3, 4, 5, 8, 10, and 11. The fixed hub B is located some distance from the end of the shaft A, and the hub is adapted to slide toward the outer end of said shaft. The hub B' is provided with a set-screw $i$, which projects into and is guided by an elongated slot $i'$ in the shaft, and the hub may be secured to the shaft at any desired adjustment by means of said set-screw. Arms or braces $j$ are secured at one end to the movable hub B', and at their outer ends said arms are attached to the central or intermediate sections $k$ of the blades. The outer sections $d$ or $g$ of the blades may be adjustably connected to the outer ends of the intermediate sections by means of any of the constructions hereinbefore described, and shown by the several figures of the drawings. It is apparent that by sliding the movable hub B' toward the stationary hub B the intermediate sections of the various blades will be slid back on the inner sections, and the reel will thus be quickly shortened. The outer sections of the blades may then be folded or slid back, as hereinbefore explained, to still further shorten the reel.

In the form of the invention shown in Figs. 10 and 11 the blades of the reel are made in telescoping metallic sections 1 2 3, the sections 1 and 2 being tubular and the section 3 made in the form of a rod adjustably secured in the section 2 by means of a set-screw 4. The sections 2 of the various blades may be connected with a movable hub B$^2$ by means of rods or braces $m$, as before explained.

Our invention is more particularly intended for use upon folding platform-binders, where it has heretofore been necessary to remove the reel, and it obviates the necessity of taking the reel from its shaft, as it will occupy less room or space on the shaft than reels do that are now removed from the shaft. Another advantage arising from our invention is that the manufacturer can make the reel from material he could not otherwise use, as a beater or blade can be made from two or from three short pieces of lumber or other material instead of its having to be all long, thereby working up much more of the material to advantage, and at the same time the fan or blade is made very much stronger than when made of one piece of lumber. We also accomplish the same end by making the fans or beaters of light tubing of different size, the larger pipe or tubing being the inside end section, while the center section is made from tubing which will slide inside of the first section, and the outer end section is made of a short piece of steel or wooden rod inserted in the middle section-tube and fastened by a set-screw, as above explained.

Our improvements are simple in construction and effectual in all respects in the performance of their functions.

Other slight changes than those above mentioned may be made without departing from the spirit of our invention or limiting its scope, and hence we do not wish to limit ourselves to the precise details herein set forth.

Having fully described our invention, what we claim as new, and desire to secure by Letters Patent, is—

1. A harvester-reel comprising a hub, a series of radiating arms secured to said hub, and a blade carried by each arm, each blade consisting of a series of sections, one section of each blade having an elongated slot therein, a pin passing through each slot and the blade-section adjacent thereto and collars embracing the sections of each blade.

2. A harvester-reel comprising a hub, a series of radiating arms secured thereto, a blade carried by the outer end of each radiating arm, each blade made in two sections pivotally connected together, one of the sections having an elongated slot through which the pivot-pin passes, whereby to permit the outer section to be moved longitudinally on the inner section and then turned back on its pivot, and a band for maintaining the two sections normally in line with each other.

3. In a reel, the combination with a shaft, of a fixed hub and an adjustable hub thereon, a series of blades, each made in sections adjustably connected together, arms connecting one section of each blade with the fixed hub and arms connecting another section of each hub with the movable hub.

4. In a reel, the combination with a shaft, a hub fixed thereto and a hub adjustably attached thereto, of a series of blades, each blade made in three sections adjustably connected together, arms connecting the inner sections of the blades with the fixed hub, and arms connecting the intermediate sections of the blades with the adjustable hub, substantially as set forth.

ANDREW J. BARTLETT.
PIERSON JACOBUS.
SPENCER W. STAMM.

Witnesses:
WILLIAM H. BUELL,
GEO. W. ATWELL, Jr.